United States Patent
Habib et al.

(10) Patent No.: US 6,903,583 B1
(45) Date of Patent: Jun. 7, 2005

(54) POWER SUPPLY SHUTDOWN CONTROL

(75) Inventors: Ahsan Habib, Pflugerville, TX (US);
Arnold T. Schnell, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/768,642

(22) Filed: Jan. 30, 2004

(51) Int. Cl.[7] ............................................... H03L 7/00
(52) U.S. Cl. ................................. 327/143; 327/198
(58) Field of Search ............................... 327/142, 143, 327/198

(56) References Cited

U.S. PATENT DOCUMENTS 5,828,697 A * 10/1998 Shin .......................... 375/222
6,438,684 B1 * 8/2002 Mitchell et al. ............... 713/1

* cited by examiner

*Primary Examiner*—Jeffrey Zweizig
(74) *Attorney, Agent, or Firm*—Baker Botts L.L.P.

(57) ABSTRACT

When a power supply is turned off its output voltages decrease over certain times. If the power supply is turned back on before the output voltages have had time to decrease to a level required by certain electronic circuits before power is reapplied, then these electronic circuits may malfunction or latch-up. A power supply shutdown control monitors voltage levels of the power supply. The power supply shutdown control prevents the power supply from being turned back on before the output voltages have reached a sufficiently low voltage level. A voltage reset monitor determines when a power supply voltage drops below a certain level, and then a memory device stores the instance of a power supply voltage drop and uses the stored instance to prevent the power supply from being turned on until the monitored voltage(s) have reached the sufficiently low voltage level. Then, the stored instance is reset and the power supply may be re-energized.

30 Claims, 3 Drawing Sheets

POWER SUPPLY SHUTDOWN CONTROL

BACKGROUND OF THE INVENTION TECHNOLOGY

1. Field of the Invention

The present invention is related to information handling systems, and, more specifically, to shutdown control of power supplies for the information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

An information handling system requires a power supply that converts utility power to voltages useable by the information handling system. However, when power is turned off to the power supply, the various power supply voltage rails get discharged based upon the load connected to them. If the power supply is quickly turned back on, the supply voltage rails may not fully discharge such that the rails do not go all the way down to substantially zero potential (or at least below 0.7 volts) before coming back up and returning to full power supply voltage levels. This can cause integrated circuit devices of the information handling system to latch-up, e.g., malfunction or assume an incorrect logic state. Certain complex logic arrays, e.g., CPLD require that the voltage to them must drop below 0.7 volt in order for them to properly reload an operating program.

Therefore, what is needed is a solution for insuring that when a power supply of an information handling system is turned off, its output voltage(s) always is less than a minimum voltage level before being re-energized to full operating output voltage(s).

SUMMARY OF THE INVENTION

The invention remedies the shortcomings of the prior art by providing a power supply shutdown control that is coupled to a power supply of an information handling system. The power supply shutdown control prevents the information handling system power supply from being turned on again until an output voltage(s) therefrom is less than a minimum voltage level(s). For example, when a power supply is turned off its output voltages, decrease over certain times. If the power supply is turned back on before the output voltages have had time to decrease to a level required by certain electronic circuits before power is reapplied, then these electronic circuits may malfunction or latch-up. A power supply shutdown control monitors voltage levels of the power supply. The power supply shutdown control prevents the power supply from being turned back on before the output voltages have reached a sufficiently low voltage level. A voltage reset monitor determines when a power supply voltage drops below a certain level, and then a memory device stores the instance of a power supply voltage drop and uses the stored instance to prevent the power supply from being turned on until the monitored voltage(s) have reached the sufficiently low voltage level. Then the stored instance is reset and the power supply may be re-energized.

A technical advantage of the present invention is preventing a power supply from being re-energized before its output voltage(s) have fallen to a desired value. Another technical advantage is preventing latch-up of digital logic because of a lack of proper reset due to voltages not being allowed to reach a desired minimum value. Other technical advantages should be apparent to one of ordinary skill in the art in view of what has been disclosed herein.

BRIEF DESCRIPTION OF THE DRAWINGS

A more complete understanding of the present disclosure and advantages thereof may be acquired by referring to the following description taken in conjunction with the accompanying drawings wherein.

Figure 1:
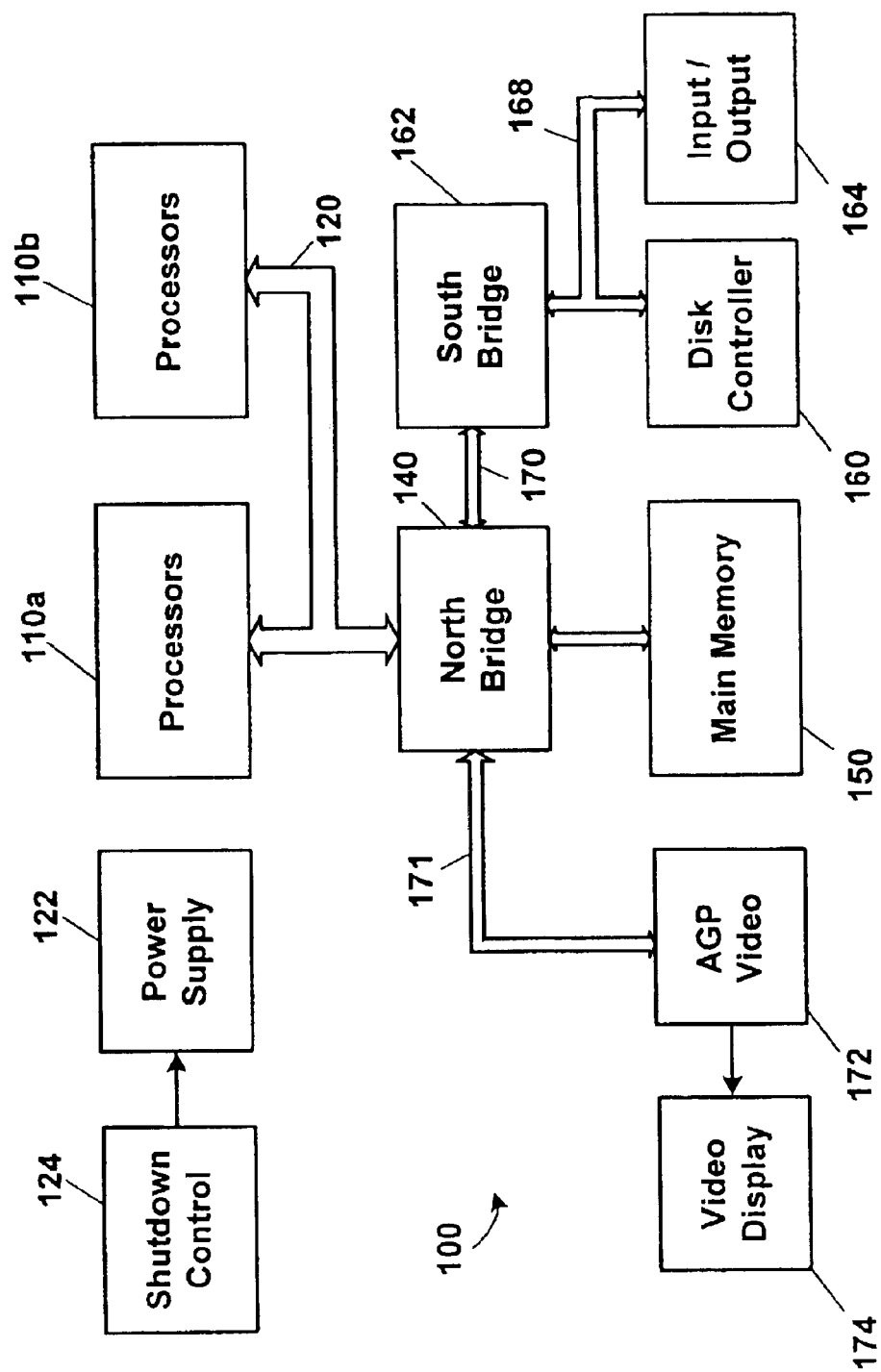
FIG. 1 is a schematic block diagram of an exemplary embodiment of an information handling system in combination with the invention.

The present invention may be susceptible to various modifications and alternative forms. Specific exemplary embodiments thereof are shown by way of example in the drawing and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of an exemplary embodiment of the present invention are schematically illustrated. Like elements in the drawings will be represented by like numbers, and similar elements will be represented by like numbers with a different lower case letter suffix.

Referring to FIG. 1, an information handling system is illustrated having electronic components mounted on at least one printed circuit board (PCB) (motherboard) and communicating data and control signals therebetween over signal buses. In one embodiment, the information handling system is a computer system. The information handling system, generally referenced by the numeral 100, comprises a processor(s) 110 coupled to a host bus 120. A north bridge 140, which may also be referred to as a memory controller hub or a memory controller, is coupled to a main system memory 150. The north bridge 140 is coupled to the system processor(s) 110 via the host bus(es) 120. The north bridge 140 is generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 140. The chip set may also be packaged as an application specific integrated circuit (ASIC). The north bridge 140 typically includes functionality to couple the main system memory 150 to other devices within the information handling system 100. Thus, memory controller functions, such as main memory control functions, typically reside in the north bridge 140. In addition, the north bridge 140 provides bus control to handle transfers between the host bus 120 and a second bus(es), e.g., PCI bus 170, AGP bus 171 coupled to video graphics display 174, etc. A second bus(es) 168 may also comprise other industry standard buses or proprietary buses, e.g., ISA, SCSI, USB buses through a south bridge(s) (bus interface) 162. These secondary buses 168 may have their own interfaces and controllers, e.g., ATA disk controller 160 and input/output interface(s) 164, and interface with a disk controller, a network interface card, a graphics controller, a hard disk and the like. A power supply 122 is coupled to and powers the information handling system 100. A shutdown control circuit 124 controls turn-on of the power supply 122 according to output voltage levels therefrom.

Figure 2:
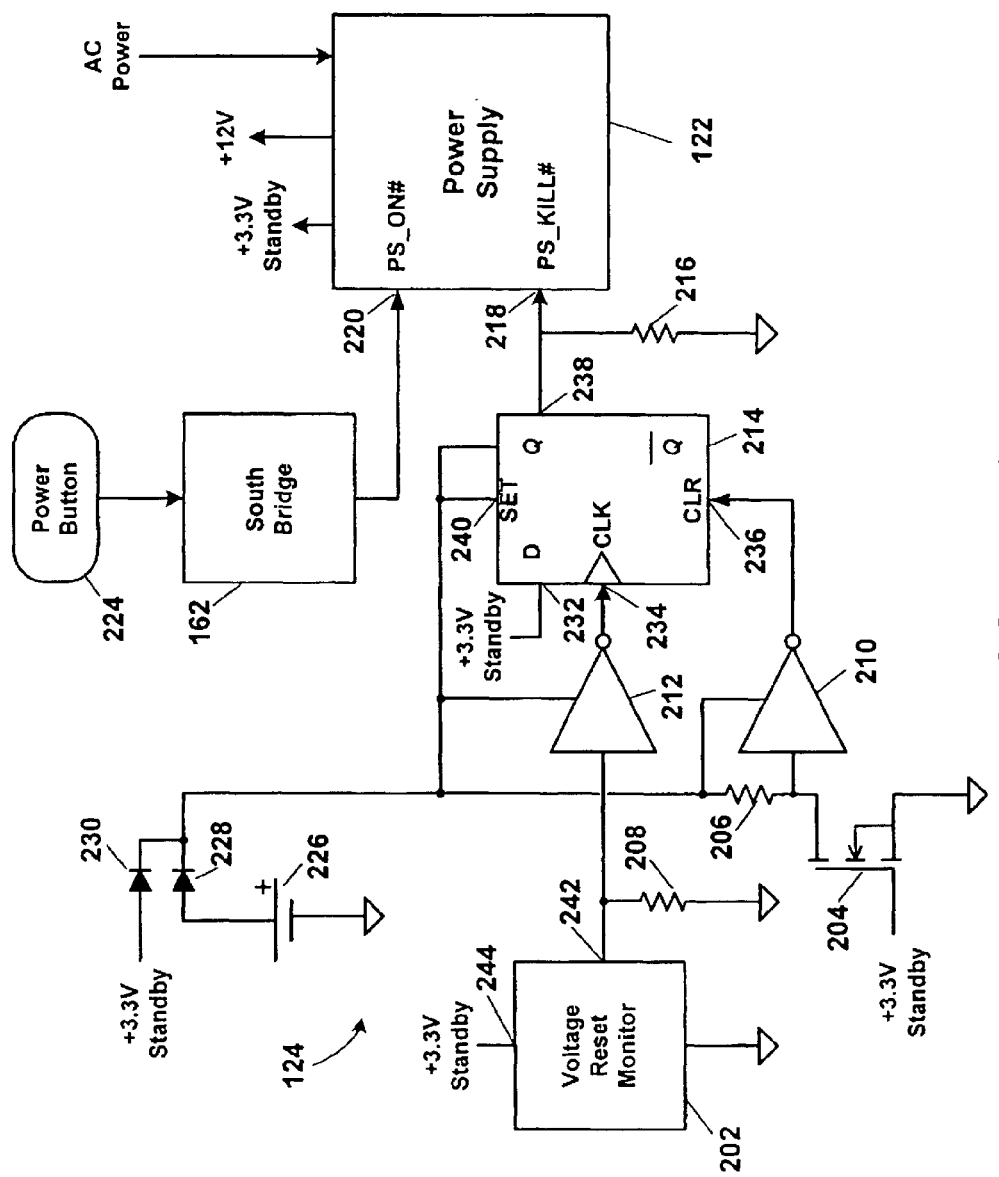
FIG. 2 is a schematic diagram of a shutdown control circuit, according to an exemplary embodiment of the invention depicted in FIG. 1.

Referring to FIG. 2, depicted is a schematic diagram of a shutdown control circuit, according to an exemplary embodiment of the invention. The shutdown control circuit, generally represented by the numeral 124, comprises a voltage reset monitor 202, a transistor 204, e.g., enhancement mode field effect transistor (FET); inverters 210 and 212, a D flip-flop 214, voltage steering diodes 228 and 230, battery 226; and resistors 206, 208 and 216. The power supply 122 typically supplies all operating voltages necessary for the information handling system 100. Generally, a power pushbutton 224 is coupled to an interface, e.g. south bridge 162, and it is used to turn the power supply 122 on and off. For example, when the power pushbutton 224 is momentarily pushed, a signal is sent to the south bridge 162 which in turn supplies either a logic high or logic low signal to input 220 (PS_ON#), turning off or on the power supply 122.

According to an exemplary embodiment of the invention, at least one voltage from the power supply 122 is monitored so that when the power supply 122 is turned off it cannot be turned back on until the at least one voltage being monitored is less than a minimum value, e.g., 0.7 volts. The power supply 122 may be inhibited from turning on by the assertion of a power supply control signal (PS-KILL#) at the input 218 until the at least one voltage being monitored is less than the minimum value. The PS-KILL# signal is a power supply control signal defined to enable/disable output voltages of the power supply 122.

The PS-KILL# signal may be obtained from a Q output 238 of the D flip-flop 214. A D-input 232 of the D flip-flop 214 is coupled to a voltage from the power supply 122, e.g., +3.3 volt standby voltage. A clear input (CLR) 236 of the D flip-flop 214 is coupled to an output of inverter 210 which has an input coupled to the drain of MOS transistor 204. A clock input (CLK) 234 is coupled to an output of inverter 212 which has an input coupled to the voltage reset monitor 202. The voltage reset monitor 202 may be, for example, but not limited to, Analog Devices ADM809. A set input (SET) 240 is maintained at a high logic level by a voltage from voltage steering diodes 228 and 230. It is contemplated and within the scope of the invention that a plurality of voltages from the power supply 122 may be monitored as described above by replicating the shutdown control circuit 124, e.g., voltage reset monitor 202, transistor 204 and D flip-flop 214, etc., for each of the plurality of voltages being monitored, and "ORing" each of the respective Q outputs 238 of the D flip-flops 214 to the PS-KILL# signal input 218.

An output 242 of the voltage reset monitor 202 will be at a first logic level, e.g., high, when a voltage (+3.3V Standby) on input 244 is greater than or equal to a reference voltage (not shown) in the voltage reset monitor 202. When the voltage on the input 244 is less than the reference voltage (not shown), the output 242 will be at a second logic level, e.g., low. The reference voltage in the voltage reset monitor 202, typically, is set around minus 5% of the nominal expected voltage so that as soon as the voltage drops below 5%, the output 242 of the voltage reset monitor 202 will go to the second logic level, low. When the output 242 goes low, the inverter 212 output goes high, thus resulting in a positive edge clock input 234 for the D flip-flop 214 which then clocks the logic level (+3.3V standby—logic high) at the D input 232 to the Q output 238 of the D flip-flop 214. The D-input 232 is connected to +3.3V standby directly, and though this voltage is 5% below normal, the voltage is still high enough for the D flip-flop 214 to latch in a logic high at the Q output 238. When the Q output 238 is at a logic high to the input 218 (PS_KILL#), the power supply 122 is prevented (disabled) from being turned on by a signal to the input 220 (PS_ON#).

Once the power supply voltage (+3.3V Standby) is less than about 0.7 volts, the FET 204 turns off (acts as a voltage detector for voltages greater than or equal to about 0.7 volts), and the CLR input 236 of the D flip-flop 214 goes to a low logic level, thereby resetting the Q output 238 to a logic low. Once the Q output 238 is at a logic low, the power supply 122 is ready to be turned on by the appropriate logic level at the input 220 (PS_ON#), and the information handling system 100 would then be able to be powered up again.

The state of the Q output 238 and the input 218 (PS-KILL#) can be derived from the following table:

| CLR | CLK | +3.3V Standby | PS_KILL# |
|---|---|---|---|
| LOW | X | X | LOW (PS Enabled) |
| HIGH | ↑ | HIGH | HIGH (PS Disabled) |
| HIGH | ↑ | LOW | LOW (PS Enabled) |
| HIGH | L | X | Q (Previous State) |

Figure 3:
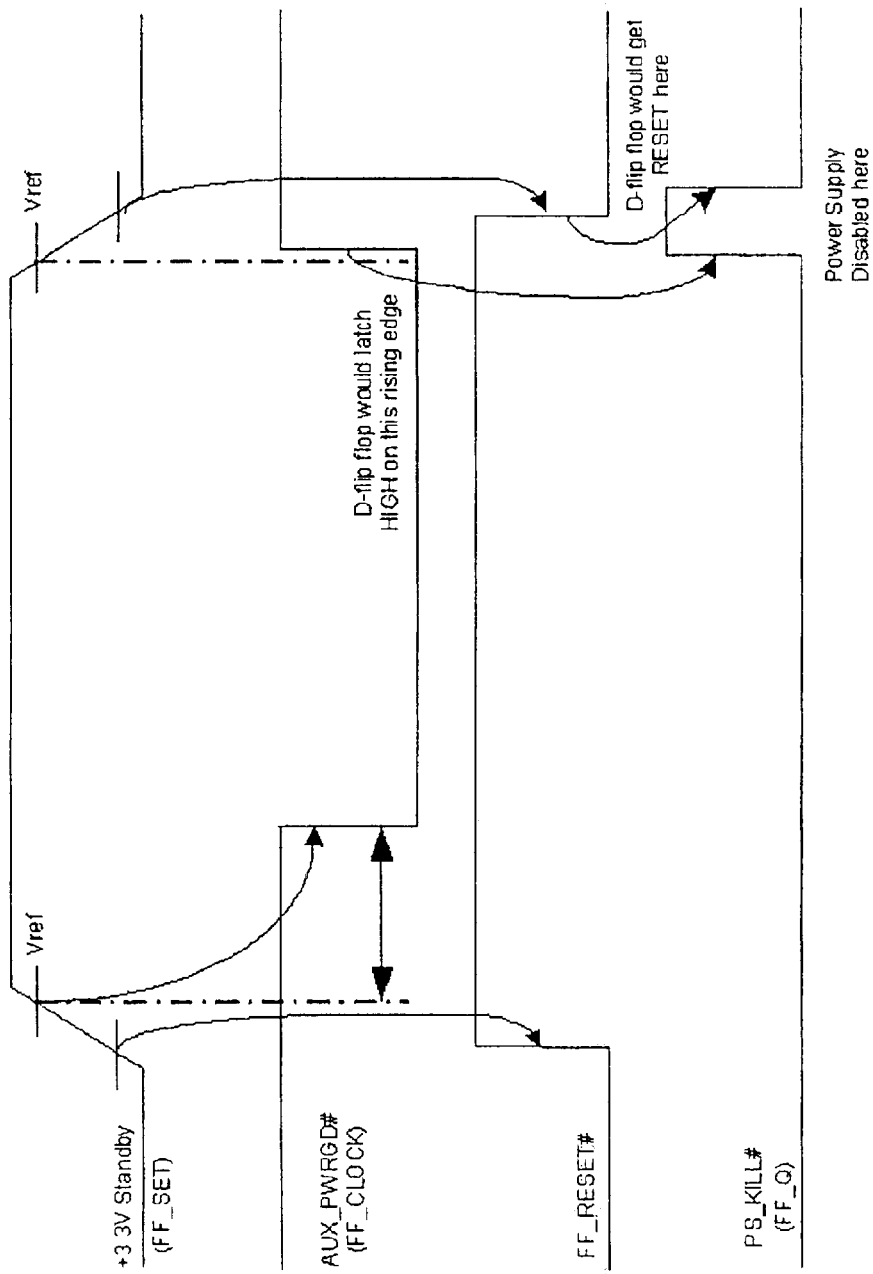
FIG. 3 is a schematic waveform timing diagram of the exemplary circuit embodiment of FIG. 2.

Referring to FIG. 3, depicted is a schematic waveform timing diagram of the exemplary circuit embodiment of FIG. 2. The $V_{IH}$ (min) for the D flip-flop 214 is approximately 2.1 volts when $V_{CC}$=3 volts and the threshold for the voltage reset monitor 202, typically (e.g., ADM809) may be about 3.08 volts. Generally the voltage reset monitor 202 is able to pull its output 242 low much quicker (in nanoseconds) than does the +3.3V Standby voltage drains from about 3.08 volts to about 2.1 volts. A resistor-capacitor (RC) delay circuit may be used with proper RC values at the D input 232 of the D flip-flop 214 to ensure reliable latching of the +3.3V Standby voltage signal. Leakage of the FET 204 (e.g., 2N7002) is less than one milliamp when off (i.e., substantially no +3.3V Standby present on its gate input— less than 0.7 volts) so the current drain from the battery 226 will be negligible. However, if the battery is bad or the voltage therefrom is absent, the pull-down resistor 216 keeps the input 218 (PS-KILL#) low and the power supply 122 may be enabled at any time.

The invention, therefore, is well adapted to carry out the objects and to attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An information handling system having power supply shutdown control, said system comprising:

an information handling system having a power supply, the power supply adapted for receiving power from an external power source and providing voltages necessary to power the information handling system, the power supply having an on-input and an inhibit-input, wherein the on-input is used to turn the power supply on and off and the inhibit-input prevents the power supply from being turned on when at a first logic level and allows the power supply to be turned on when at a second logic level; and a shutdown control circuit monitoring at least one voltage from the power supply, the shutdown control circuit having an output coupled to the inhibit-input of the power supply, wherein when the at least one voltage is less than a first voltage value the shutdown control circuit output is set to the first logic level, and when the at least one voltage is less than a second voltage value the shutdown control circuit output is reset to the second logic level.

2. The information handling system according to claim 1, wherein the on-input is coupled to an on-off power switch.

3. The information handling system according to claim 1, wherein the on-input is coupled to a power pushbutton and a control circuit.

4. The information handling system according to claim 1, wherein the shutdown control circuit comprises:

a voltage reset monitor having an output and an input coupled to the at least one voltage from the power supply, wherein the voltage reset monitor output is at a first logic level when the at least one voltage is greater than or equal to the first voltage value and at a second logic level when the at least one voltage is less than the first voltage value;

a voltage detector having an input coupled to the at least one voltage from the power supply and an output, wherein the voltage detector output is at the first logic level when the at least one voltage from the power supply is greater than or equal to the second voltage value and is at the second logic level when the at least one voltage is less than the second voltage value;

a memory circuit having an input coupled to the output of the voltage reset monitor, clear input coupled to output of the voltage detector, and an output coupled to the inhibit-input of the power supply; and a continuous power source that supplies power to the voltage detector and the memory circuit; wherein when the voltage reset monitor output goes from the first logic level to the second logic level the memory circuit output is set to the first logic level and when the voltage detector output is at the second logic level the memory circuit output is reset to the second logic level.

5. The information handling system according to claim 4, wherein the voltage detector is a transistor biased to cutoff when its input is less than the second voltage value.

6. The information handling system according to claim 5, wherein the transistor is a field effect transistor (FET).

7. The information handling system according to claim 6, wherein the FET is an enhancement mode FET.

8. The information handling system according to claim 4, wherein the memory circuit is a D flip-flop, wherein the voltage reset monitor output is coupled to a D-input of the D flip-flop, the voltage detector output is coupled to a clear input of the D flip-flop, and a Q-output of the D flip-flop is coupled to the inhibit-input of the power supply.

9. The information handling system according to claim 4, wherein the continuous power source is a battery.

10. The information handling system according to claim 1, wherein the first voltage value is about 95 percent of the at least one voltage normal operating value.

11. The information handling system according to claim 1, wherein the second voltage value is about 0.7 volts.

12. A method for preventing a power supply from being re-energized before at least one voltage therefrom is below a minimum voltage level, said method comprising the steps of:

providing a power supply in an information handling system that receives power from an external power source and provides voltages necessary to power the information handling system, the power supply having an on-input and an inhibit-input, wherein the on-input turns the power supply on and off and the inhibit-input prevents the power supply from being turned on when at a first logic level and allows the power supply to be turned on when at a second logic level; and monitoring at least one voltage from and controlling the power supply with a shutdown control circuit, the shutdown control circuit having an output coupled to the inhibit-input of the power supply, wherein when the at least one voltage is less than a first voltage value the shutdown control circuit prevents the power supply from being turned on until the at least one voltage is less than a second voltage value.

13. The method according to claim 12, further comprising the steps of turning the power supply on and off with a switch.

14. The method according to claim 13, wherein the switch is a momentary pushbutton.

15. The method according to claim 14, wherein the momentary pushbutton is coupled to the power supply with an on-off control circuit.

16. The method according to claim 12, wherein the steps of monitoring at least one voltage from and controlling the power supply, comprise the steps of:

providing a voltage reset monitor for monitoring the at least one voltage from the power supply, wherein the voltage reset monitor is at a first logic level when the at least one voltage is greater than or equal to the first voltage value and at a second logic level when the at least one voltage is less than the first voltage value;

providing a voltage detector for monitoring the at least one voltage from the power supply, wherein the voltage detector is at the first logic level when the at least one voltage from the power supply is greater than or equal to the second voltage value and is at the second logic level when the at least one voltage is less than the second voltage value;

providing a memory circuit coupled to the voltage reset monitor, the voltage detector and to the inhibit-input of the power supply; and providing a continuous power source for supplying power to the voltage detector and the memory circuit; wherein when the voltage reset monitor goes from the first logic level to the second logic level the memory circuit is set to the first logic level and when the voltage detector is at the second logic level the memory circuit is reset to the second logic level.

17. The method according to claim 12, wherein the first voltage value is about 95 percent of the at least one voltage normal operating value.

18. The method according to claim 12, wherein the second voltage value is about 0.7 volts.

19. A apparatus for preventing a power supply from being re-energized before at least one voltage therefrom is below a minimum voltage level, said apparatus comprising:

a voltage reset monitor having an output and an input coupled to at least one voltage from a power supply, wherein the voltage reset monitor output is at a first logic level when the at least one voltage is greater than or equal to a first voltage value and at a second logic level when the at least one voltage is less than the first voltage value;

a voltage detector having an input coupled to the at least one voltage from the power supply and an output, wherein the voltage detector output is at the first logic level when the at least one voltage from the power supply is greater than or equal to the second voltage value and is at the second logic level when the at least one voltage is less than the second voltage value;

a memory circuit having an input coupled to the output of the voltage reset monitor, clear input coupled to output of the voltage detector, and an output coupled to the inhibit-input of the power supply; and a continuous power source that supplies power to the voltage detector and the memory circuit; wherein when the voltage reset monitor output goes from the first logic level to the second logic level the memory circuit output is set to the first logic level and when the voltage detector output is at the second logic level the memory circuit output is reset to the second logic level.

20. The apparatus according to claim 19, wherein the voltage detector is a transistor biased to cutoff when its input is less than the second voltage value.

21. The apparatus according to claim 20, wherein the transistor is a field effect transistor (FET).

22. The apparatus according to claim 21, wherein the FET is an enhancement mode FET.

23. The apparatus according to claim 19, wherein the memory circuit is a D flip-flop, wherein the voltage reset monitor output is coupled to a D-input of the D flip-flop, the voltage detector output is coupled to a clear input of the D flip-flop, and a Q-output of the D flip-flop is coupled to the inhibit-input of the power supply.

24. The apparatus according to claim 19, wherein the continuous power source is a battery.

25. The apparatus according to claim 19, wherein the first voltage value is about 95 percent of the at least one voltage normal operating value.

26. The apparatus according to claim 19, wherein the second voltage value is about 0.7 volts.

27. An information handling system having power supply shutdown control, said system comprising:

an information handling system having a power supply, the power supply adapted for receiving power from an external power source and providing a plurality of voltages necessary to power the information handling system, the power supply having an on-input and an inhibit-input, wherein the on-input is used to turn the power supply on and off and the inhibit-input is used to prevent the power supply from being turned on; and a shutdown control circuit for monitoring the plurality of voltages from the power supply, the shutdown control circuit having an output coupled to the inhibit-input of the power supply, wherein when any one of the plurality of voltages is less than a respective nominal operating voltage and greater than a minimum voltage the shutdown control circuit output sends a disable signal to the inhibit-input to prevent the power supply from being turned on, and when all of the plurality of voltages are less than or equal to the minimum voltage or greater than or equal to the respective nominal operating voltages the shutdown control circuit output sends an enable signal to the inhibit-input to allow the power supply to be turned on.

28. The information handling system according to claim 27, wherein the shutdown control circuit comprises:

a plurality of voltage reset monitors each having an output and an input coupled to a respective one of the plurality of voltages from the power supply, wherein each output of the plurality of voltage reset monitors is at a first logic level when a respective one of the plurality of voltages is greater than or equal to the respective nominal operating voltage and at a second logic level when the respective one of the plurality of voltages is less than the respective nominal operating voltage and greater than the minimum voltage;

a plurality of voltage detectors, each of the plurality of voltage detectors having an input coupled to the respective one of the plurality of voltages from the power supply and an output, wherein the voltage detector output is at the first logic level when the respective one of the plurality of voltages from the power supply is greater than or equal to the minimum voltage and is at the second logic level when the respective one of the plurality of voltages is less than the minimum voltage;

a plurality of memory circuits, each of the plurality of memory circuits having an input coupled to the output of the respective voltage reset monitor, a clear input coupled to output of the respective voltage detector, and an output coupled to an input of a logic OR circuit, wherein the logic OR circuit has a output coupled to the inhibit-input of the power supply; and a continuous power source that supplies power to the plurality of voltage detectors and the plurality of memory circuits; wherein whenever a one of the plurality of voltage reset monitor outputs goes from the first logic level to the second logic level the respective output of the one of the plurality of memory circuits is set to the first logic level and when the voltage detector output is at the second logic level the respective output of the one of the plurality of memory circuits is reset to the second logic level, whereby if any one or more outputs of the plurality of memory circuits is at the first logic level then the OR circuit output sends the disable signal to the inhibit-input to prevent the power supply from being turned on, and when all of the outputs of the plurality of memory circuits are at the second logic level the OR circuit output sends the enable signal to the inhibit-input to allow the power supply to be turned on.

29. A method for preventing a power supply from being re-energized before all of a plurality of operating voltages therefrom are below a minimum voltage level, said method comprising the steps of:

providing a power supply in an information handling system that receives power from an external power source and provides a plurality of voltages necessary to power the information handling system, the power supply having an on-input and an inhibit-input, wherein the on-input turns the power supply on and off and the inhibit-input prevents the power supply from being turned on; and monitoring each of the plurality of voltages from and controlling the power supply with a shutdown control circuit, the shutdown control circuit having an output coupled to the inhibit-input of the power supply, wherein when any one of the plurality of voltages is less than a respective nominal operating voltage and greater than a minimum voltage the shutdown control circuit output sends a disable signal to the inhibit-input to prevent the power supply from being turned on, and when all of the plurality of voltages are less than or equal to the minimum voltage or greater than or equal to the respective nominal operating voltages the shutdown control circuit output sends an enable signal to the inhibit-input to allow the power supply to be turned on.

30. The method according to claim 29, wherein the steps of monitoring each of the plurality of voltages from and controlling the power supply, comprise the steps of:

monitoring each of the plurality of voltages from the power supply with a voltage reset monitor, wherein the voltage reset monitor is at a first logic level when the respective one of the plurality of voltages is greater than or equal to the respective nominal operating voltage and at a second logic level when the respective one of the plurality of voltages is less than the respective nominal operating voltage and greater than the minimum voltage;

monitoring each of the plurality of voltages from the power supply with a voltage detector, wherein the voltage detector is at the first logic level when the respective one of the plurality of voltages from the power supply is greater than or equal to the minimum voltage and is at the second logic level when the respective one of the plurality of voltages is less than the minimum voltage;

storing each of the voltage reset monitor logic levels in a respective memory circuit; and resetting the respective memory circuit to the first logic level when the respective one of the plurality of voltages from the power supply is less than the minimum voltage; and logically combining the memory circuit logic levels such that whenever any memory circuit logic level is at the second logic level the shutdown control circuit output sends a disable signal to the inhibit-input to prevent the power supply from being turned on.

* * * * *